United States Patent [19]

Heim et al.

[11] Patent Number: 4,940,034

[45] Date of Patent: Jul. 10, 1990

[54] CONTROL CIRCUIT AND METHOD FOR CONTROLLING THE SPEED OF AN ELECTRIC FUEL PUMP FOR AN INTERNAL COMBUSTION ENGINE EQUIPPED WITH FUEL INJECTION

[75] Inventors: Hans Heim, Stuttgart; Hermann-Josef Klein, Eberdingen-Hochdorf, both of Fed. Rep. of Germany

[73] Assignee: Robert Bosch GmbH, Stuttgart, Fed. Rep. of Germany

[21] Appl. No.: 294,732

[22] Filed: Jan. 6, 1989

[30] Foreign Application Priority Data

Jan. 7, 1988 [DE] Fed. Rep. of Germany ....... 3800177

[51] Int. Cl.⁵ .............................................. F02M 39/00
[52] U.S. Cl. ..................................... 123/497; 123/351; 123/198 D
[58] Field of Search ........... 123/497, 498, 499, 198 D, 123/198 DB, 351

[56] References Cited

U.S. PATENT DOCUMENTS

| | | |
|---|---|---|
| 3,581,839 | 6/1971 | Carp ..................................... 123/351 |
| 3,630,177 | 12/1971 | Eivgel ................................. 123/335 |
| 3,648,808 | 2/1972 | Kato .................................... 123/335 |
| 3,693,603 | 9/1972 | Lemanczyk ......................... 123/351 |
| 3,817,225 | 6/1974 | Priegel ................................ 123/497 |
| 3,822,677 | 7/1974 | Reddy ................................. 123/497 |
| 3,867,918 | 2/1975 | Williams ............................. 123/497 |
| 3,967,598 | 7/1976 | Rachel ................................ 123/497 |
| 4,404,939 | 9/1983 | Kinzl ............................. 123/198 DB |
| 4,573,440 | 3/1986 | Pischke .............................. 123/332 |
| 4,791,905 | 12/1988 | Furuta ................................ 123/497 |
| 4,797,826 | 1/1989 | Onogi ................................. 123/351 |

*Primary Examiner*—Carl S. Miller
*Attorney, Agent, or Firm*—Walter Ottesen

[57] ABSTRACT

The invention is directed to a control circuit for controlling the speed of an electric fuel pump for an internal combustion engine having fuel injection and includes a speed limit-value comparator for controlling the speed or delivery rate of the fuel pump to a value below the minimum speed or delivery rate for a speed of the engine above a specific predetermined limit speed which is impermissibly high. The minimum speed or minimum delivery rate is then the delivery rate which is required for at least building up the system pressure in the fuel injection system.

4 Claims, 2 Drawing Sheets

CONTROL CIRCUIT AND METHOD FOR CONTROLLING THE SPEED OF AN ELECTRIC FUEL PUMP FOR AN INTERNAL COMBUSTION ENGINE EQUIPPED WITH FUEL INJECTION

FIELD OF THE INVENTION

The invention relates to a control circuit for controlling the speed of an electric fuel pump for an internal combustion engine equipped with fuel injection by means of which the speed and delivery rate of the fuel pump is controllable in dependence upon the fuel requirements of the engine. The invention also relates to a method for controlling the speed of the electric fuel pump.

BACKGROUND OF THE INVENTION

Control circuits of the above kind operate especially to reduce the development of noise and heat of the fuel pump of motor vehicles during part load operation and idle operation by reducing the speed of the pump. Such a control circuit is disclosed in International Patent Application PCT/DE87/00095, filed on Mar. 5, 1987, and designating the United States of America. The control circuit disclosed in this publication contains a unit which provides that the fuel pump operates with at least a minimal speed and thereby maintains a corresponding minimum fuel supply. This is especially required for internal combustion engines equipped with fuel injection since a minimal delivery rate must always be provided by the electric fuel pump for all fuel injection systems to build up the system pressure.

It is generally known to protect an internal combustion engine against impermissibly high speeds by including a speed limiting device. For this, two different possibilities are known.

In the first possibility, a speed limitation is achieved by switching off the fuel injection above a predetermined maximum speed. For this purpose, an appropriate control function must be present in the particular injection control.

The second possibility of providing a speed limitation is carried out in spark-ignition engines by switching off the ignition. This leads to an undesired high pollutant emission and unfavorably influences a catalyzer should one be present.

SUMMARY OF THE INVENTION

The control circuit according to the invention provides the advantage over the above possibilities in that a speed limitation is achieved for protecting the engine via the speed-dependent control of the electric fuel pump. For this purpose, the electric fuel pump is so controlled when a maximum speed for the engine is exceeded that the speed of the fuel pump is controlled beneath minimum speed (or delivery rate) for maintaining the required system pressure in the fuel injection system. This provides a fuel switch-off which, however, is switched on and off in a narrow speed range. A limitation of speed having a narrow hysteresis is obtained in this manner. Only a low pollutant emission occurs here when compared to limiting speed by switching off the ignition and, should a catalyzer be present, the protection of this component is improved.

It is especially advantageous to also apply the speed gradient of the speed of the engine for maintaining a narrow hysteresis for the switch-off.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
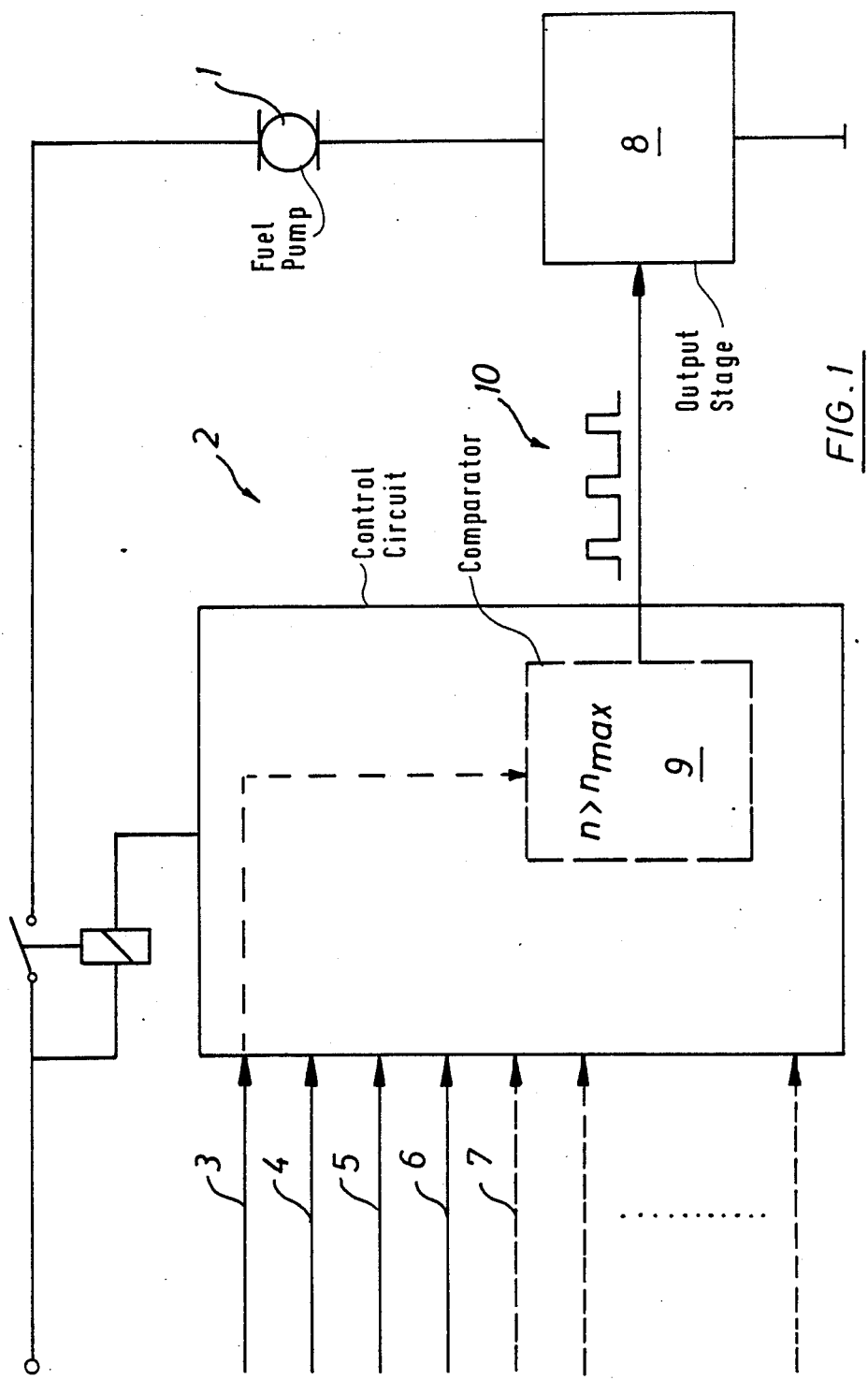
FIG. 1 shows a block diagram of a control circuit for an electric fuel pump; and, FIG. 2 is a flow diagram of the control method for detecting the boundary speed of the engine and for controlling down the speed of the electric fuel pump.

In FIG. 1, an electric fuel pump 1 is driven via a control circuit 2. The control circuit 2 has input 3 for the speed (n) of the internal combustion engine, and further inputs for the load 4, for the fuel temperature 5 and for the battery voltage 6. The plurality of dashed arrows 7 present the possibility for connecting further quantities which influence the fuel requirement. The control circuit 2 determines the fuel requirement of the engine in dependence upon these input quantities and controls the electric fuel pump with the aid of a variable pulse duty factor 10 so that the speed of the fuel pump is adapted to the fuel requirement.

The fuel pump can however also be controlled with the aid of a variable voltage. The direct drive of the fuel pump occurs via an end stage 8.

The essential influencing quantity for the control is constituted by the speed (n) since the fuel requirement increases with higher speeds. According to the invention, the speed signal is also directed to a switching component configured as a speed limit-value comparator 9 for a limit speed of the engine. When the limit speed is exceeded, the speed limit-value comparator 9 switches and controls the pulse duty factor and thereby the speed and delivery rate of the electric fuel pump to a value beneath the minimum delivery rate for building up the system pressure in the fuel injection system. However, the fuel pump is not completely switched off in this way and, is instead, simply operated below the predetermined minimum speed.

Figure 2:
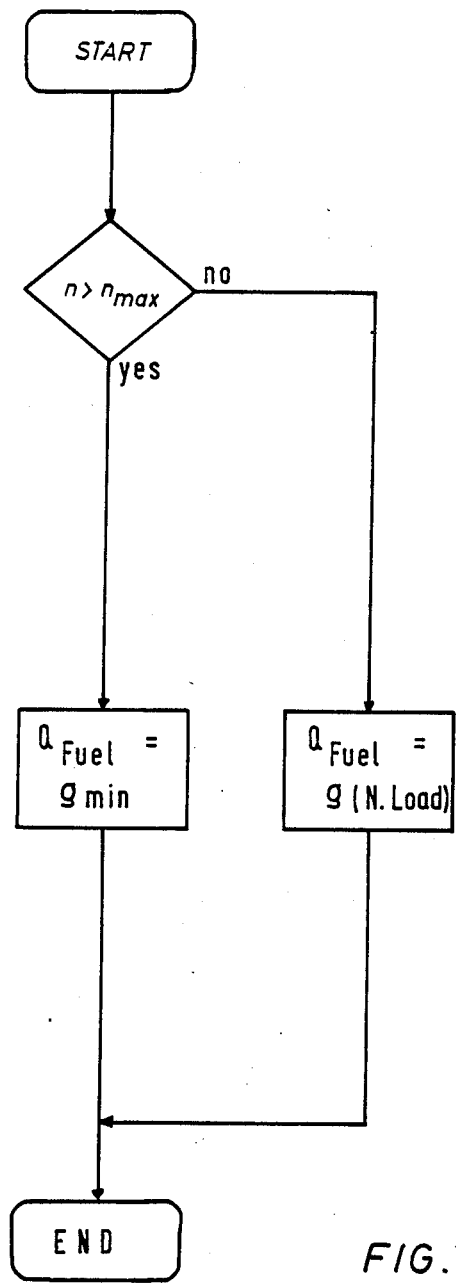

The function of the control circuit of FIG. 1 and the method for monitoring speed will now be explained with reference to FIG. 2.

The speed quantity (n) is compared to determine whether it lies above or below a predetermined limit speed ($n_{max}$) for the engine. If the speed is below the limit speed ($n_{max}$), the control circuit makes the fuel required available by means of an appropriate speed of the fuel pump with the fuel required being dependent essentially on the speed of the engine under load.

If the speed of the engine is above the limit value, the delivery rate is dropped below the minimum delivery rate by means of an appropriate programming of the speed dependency.

In one embodiment of the invention, and when the speed of the engine rapidly approaches the limit speed, the speed gradient of the speed of the engine can be included in the control so that the speed of the fuel pump can be controlled down somewhat before the limit speed is reached so that the limit speed is exceeded only slightly by an overshoot of the control. Similarly, the speed gradient can also again be used for the transition to normal operation or to running up the speed.

It is understood that the foregoing description is that of the preferred embodiments of the invention and that various changes and modifications may be made thereto without departing from the spirit and scope of the invention as defined in the appended claims.

What is claimed is:

1. A control circuit for an internal combustion engine equipped with a fuel injection system wherein a pressure is generated in the system for injecting the fuel, the control circuit comprising:

an input for receiving an input signal having a magnitude indicative of the speed (n) of the engine;

control means connected to said input for receiving said input signal and for controlling and adapting the speed and delivery rate of said fuel pump to the quantity of fuel required by the engine;

speed limit-value means for controlling the speed of said fuel pump to a speed value below a minimum value when the speed (n) of the engine exceeds or is about to exceed a specific predetermined maximum speed ($n_{max}$), said speed value of said pump being sufficient for maintaining the system pressure in said system for injecting the fuel; and, said speed limit-value means being a comparator which includes a unit for determining the speed gradient of the speed of the engine, said speed gradient being applied for controlling the speed and delivery rate of the fuel pump.

2. The control circuit of claim 1, comprising additional inputs for applying respective signals to said control means indicative of the load on the engine, temperature of the fuel and battery voltage.

3. A method for controlling the speed of an electric fuel pump for an internal combustion engine equipped with fuel injection in dependence upon the speed (n) of the engine, the method comprising the step of: controlling the speed and delivery rate of the fuel pump to a predetermined value below a minimum speed and delivery rate in response to a speed (n) of the engine above a specific predetermined speed ($n_{max}$) thereof which is impermissibly high; determining the speed gradient of the engine speed and utilizing said speed gradient in the control of the speed and delivery rate of the fuel pump in such a manner that the speed of the fuel pump is controlled down to said predetermined value even before said speed ($n_{max}$) is reached in response to a rapid increase in said speed (n).

4. The method of claim 3, wherein the speed of the fuel pump is run up even before said speed ($n_{max}$) is reached in response to a rapid drop of the speed (n) of the engine which passes through said speed ($n_{max}$).

* * * * *